US011901611B2

(12) United States Patent
Nasu et al.

(10) Patent No.: US 11,901,611 B2
(45) Date of Patent: Feb. 13, 2024

(54) ANTENNA DEVICE AND ELECTRONIC APPARATUS

(71) Applicant: Murata Manufacturing Co., Ltd., Nagaokakyo (JP)

(72) Inventors: Takafumi Nasu, Nagaokakyo (JP); Kenichi Ishizuka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 356 days.

(21) Appl. No.: 17/356,568

(22) Filed: Jun. 24, 2021

(65) Prior Publication Data

US 2021/0320397 A1 Oct. 14, 2021

Related U.S. Application Data

(63) Continuation of application No. PCT/JP2020/030806, filed on Aug. 13, 2020.

(30) Foreign Application Priority Data

Sep. 19, 2019 (JP) ................................ 2019-170614

(51) Int. Cl.

| | |
|---|---|
| ***H01Q 5/378*** | (2015.01) |
| ***H01Q 1/24*** | (2006.01) |
| ***H01Q 1/48*** | (2006.01) |
| ***H01Q 7/00*** | (2006.01) |

(52) U.S. Cl.
CPC ............... *H01Q 1/243* (2013.01); *H01Q 1/48* (2013.01); *H01Q 5/378* (2015.01); *H01Q 7/00* (2013.01)

(58) Field of Classification Search
CPC ............... H01Q 1/243; H01Q 1/48–50; H01Q 5/30–35; H01Q 5/378–385
See application file for complete search history.

(56) References Cited

U.S. PATENT DOCUMENTS

| | | | | |
|---|---|---|---|---|
| 2013/0249767 | A1* | 9/2013 | Ishizuka | H03H 7/38 333/124 |
| 2014/0049440 | A1 | 2/2014 | Ueki et al. | |
| 2014/0266964 | A1* | 9/2014 | Kato | H01Q 5/335 343/860 |
| 2019/0173175 | A1 | 6/2019 | Mikawa et al. | |

(Continued)

FOREIGN PATENT DOCUMENTS

| | | | |
|---|---|---|---|
| JP | 2014-53808 | A | 3/2014 |
| WO | 2012/153690 | A1 | 11/2012 |

(Continued)

OTHER PUBLICATIONS

Official Communication issued in International Patent Application No. PCT/JP2020/030806, dated Nov. 10, 2020.

*Primary Examiner* — Hasan Islam
(74) *Attorney, Agent, or Firm* — Keating & Bennett, LLP

(57) ABSTRACT

An antenna device includes a first radiating element, a second radiating element having lower radiation efficiency than the first radiating element, a coupling element including first and second coils that are electromagnetically coupled to each other, and first and second phase adjusting elements. The first and second phase adjusting elements induce, at a resonant frequency of the second radiating element, a predetermined proportion of current flowing through the second radiating element to the first radiating element.

20 Claims, 6 Drawing Sheets

(56) References Cited

U.S. PATENT DOCUMENTS

| | | | | |
|---|---|---|---|---|
| 2019/0214727 | A1 | 7/2019 | Mikawa et al. | |
| 2020/0153099 | A1 | 5/2020 | Ishizuka | |
| 2020/0373650 | A1 | 11/2020 | Nasu | |
| 2021/0119335 | A1* | 4/2021 | Mizuno | H01Q 1/48 |

FOREIGN PATENT DOCUMENTS

| | | | |
|---|---|---|---|
| WO | 2018/101284 | A1 | 6/2018 |
| WO | 2018/101285 | A1 | 6/2018 |
| WO | 2019/017098 | A1 | 1/2019 |
| WO | 2019/208044 | A1 | 10/2019 |

* cited by examiner

ANTENNA DEVICE AND ELECTRONIC APPARATUS

CROSS REFERENCE TO RELATED APPLICATIONS

This application claims the benefit of priority to Japanese Patent Application No. 2019-170614 filed on Sep. 19, 2019 and is a Continuation Application of PCT Application No. PCT/JP2020/030806 filed on Aug. 13, 2020. The entire contents of each application are hereby incorporated herein by reference.

BACKGROUND OF THE INVENTION

1. Field of the Invention

The present invention relates to an antenna device connected to a high-frequency circuit and an electronic apparatus including the antenna device.

2. Description of the Related Art

In an antenna for a cellular phone, a frequency band that is used is further expanded, and characteristics corresponding to a wide band are required. International Publication No. 2012/153690 describes a technique of providing a coupling element between a power supply circuit and a power supply radiating element and adding a parasitic element connected to the coupling element in order to widen the band of an antenna device.

As described in International Publication No. 2012/153690, an antenna device having a configuration in which a parasitic radiating element is added needs a space for the parasitic radiating element but an installation space of the radiating element is more limited with recent increases in the size of the display, and the like. Therefore, the parasitic radiating element is installed in a limited region, and it is difficult to obtain preferable radiation characteristics.

SUMMARY OF THE INVENTION

Preferred embodiments of the present invention provide antenna devices that each include a parasitic radiating element in a limited installation region and a band of which is widened by a power supply radiating element and the parasitic radiating element, and electronic apparatuses each including such antenna devices.

An antenna device according to a preferred embodiment of the present invention includes a first radiating element, a second radiating element, a first coil that includes a first end connected to a power supply circuit and a second end connected to the first radiating element, a second coil that includes a first end connected to the second radiating element and a second end connected to ground and is electromagnetically coupled to the first coil, a first phase adjusting element that includes a first end connected to the power supply circuit and a second end connected to the ground and is configured to adjust a phase difference between a current flowing through the first radiating element and a current flowing through the second radiating element, and a second phase adjusting element that includes a first end connected to the first end of the second coil and a second end connected to the ground and is configured to adjust the phase difference between the current flowing through the first radiating element and the current flowing through the second radiating element.

With the above-described configuration, a portion of the current flowing through the second radiating element is induced to the first radiating element, and a signal in a resonant frequency band of the second radiating element is radiated by the first radiating element, thus obtaining an antenna device with high radiation efficiency over a wide band.

An electronic apparatus according to a preferred embodiment of the present invention includes an antenna device according to a preferred embodiment of the present invention, a power supply circuit, and a housing that houses the power supply circuit.

With the above-described configuration, even when the second radiating element is installed in a limited region, the current in the frequency band allocated to the second radiating element also flows through the first radiating element, so that the radiation characteristics are widened.

According to preferred embodiments of the present invention, it is possible to obtain antenna devices that each include the parasitic radiating element provided in the limited installation region and the widened band by the power supply radiating element and the parasitic radiating element, and electronic apparatuses including the same.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An "antenna device" to be described in each preferred embodiment of the present invention may be applied on both a signal transmission side and a signal reception side. Even when the "antenna device" is described as an antenna radiating electromagnetic waves, the antenna device is not limited to a generation source of the electromagnetic waves. Even when the electromagnetic waves radiated by a communication counterpart antenna device are received, that is, a relationship between transmission and reception is reversed, the same advantageous effects are achieved.

First Preferred Embodiment

Figure 1A:
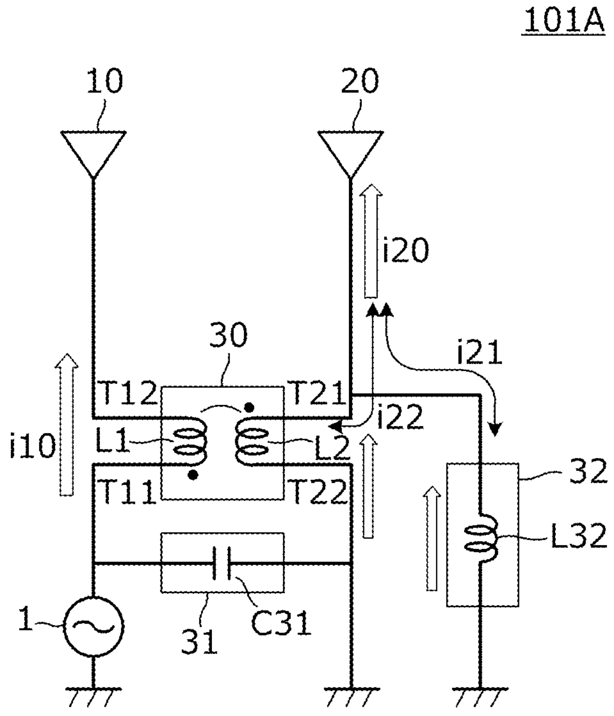
FIGS. 1A and 1B are circuit diagrams illustrating the configurations of antenna devices 101A and 101B according to a first preferred embodiment of the present invention.
Figure 1B:
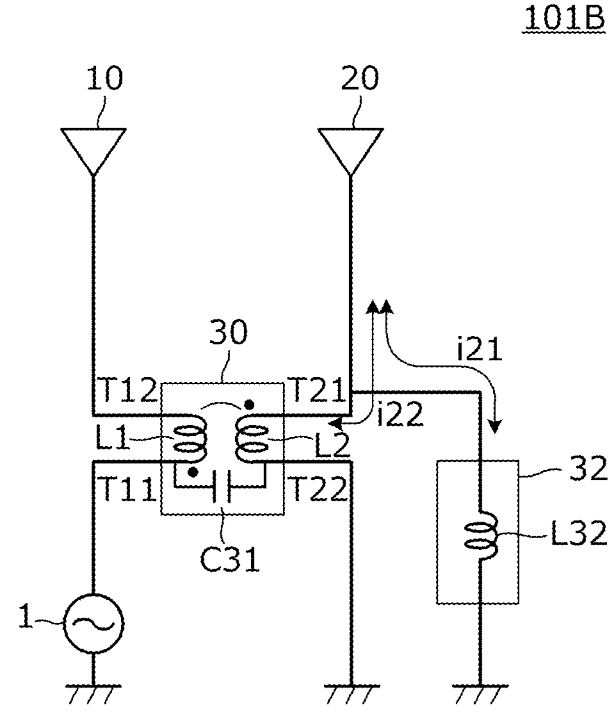

FIGS. 1A and 1B are circuit diagrams illustrating the configurations of antenna devices 101A and 101B according to a first preferred embodiment of the invention.

First, the antenna device 101A illustrated in FIG. 1A will be described. The antenna device 101A includes a first radiating element 10, a second radiating element 20, a coupling element 30, a first phase adjusting element 31, and a second phase adjusting element 32. The first radiating element 10 is a power supply radiating element, and the second radiating element 20 is a parasitic radiating element.

In the antenna device 101A according to the present preferred embodiment, radiation efficiency of the second radiating element 20 is lower than that of the first radiating element 10. For example, the first radiating element 10 has a wide electromagnetic field space therearound, whereas the second radiating element 20 has a narrow electromagnetic field space therearound. The term "radiation efficiency" refers to a ratio of radiation power to input power to the radiating element. A relationship between the electromagnetic field space of the radiating element and the radiation efficiency will be described below in detail.

The coupling element 30 includes a first coil L1 and a second coil L2 that are electromagnetically coupled to each other. The first coil L1 includes a first end T11 connected to a power supply circuit 1 and a second end T12 connected to the first radiating element 10. The second coil L2 includes a first end T21 connected to the second radiating element 20 and a second end T22 connected to the ground.

The first phase adjusting element 31 includes a first end connected to the power supply circuit 1 and a second end connected to the ground. The second phase adjusting element 32 includes a first end connected to the first end of the second coil L2 and a second end connected to the ground.

The first phase adjusting element 31 and the second phase adjusting element 32 adjust a phase difference between a current i10 flowing through the first radiating element 10 and a current i20 flowing through the second radiating element 20.

The first phase adjusting element 31 includes a capacitor C31 that induces a predetermined proportion of the current i20 flowing through the second radiating element 20 to the first radiating element 10 at a resonant frequency of the second radiating element 20.

The second phase adjusting element 32 includes an inductor L32 that causes resonant current flowing through the second radiating element 20 to flow into the second coil L2. As illustrated in FIGS. 1A and 1B, a resonant current i21 flows through the second radiating element 20 and the second phase adjusting element 32, and a portion of the resonant current flows through the second coil L2. Therefore, the inductance of the inductor L32 changes the resonant current i21 to change a current i22 flowing from the second radiating element 20 to the second coil L2. That is, when a portion of the resonant current i21 flows into the second coil L2, the phase of the current flowing through the second coil L2 is changed. The difference between the phase of the current flowing through the first radiating element 10 and the phase of the current flowing through the second radiating element 20 is thus adjusted. Outlined thick arrows indicate comprehensive current paths in FIG. 1A.

The connection of the first radiating element 10 to the first coil L1 and the connection of the second radiating element 20 to the second coil L2 are configured such that the direction of a magnetic field generated in the first coil L1 when the current flows from the first coil L1 to the first radiating element 10 and the direction of a magnetic field generated in the second coil L2 when the current flows from the second coil L2 to the second radiating element 20 are opposite to each other.

When the band is widened by the parasitic radiating element in a space-saving manner at a high frequency, the electromagnetic field coupling between the first radiating element 10 and the second radiating element 20 becomes too strong, and preferable antenna matching is not obtained in some cases. In this case, it is possible to adjust the coupling degree and improve antenna matching by providing the coupling element 30 that provides the magnetic field coupling with the polarity as described above.

On the other hand, when a gap between the first radiating element 10 and the second radiating element 20 is relatively large, for example, sufficient electromagnetic field coupling cannot be obtained only by the first radiating element 10 and the second radiating element 20. In this case, a coupling element with a coupling relationship between the first coil L1 and the second coil L2 that is reversed to that of the above-described coupling element 30 is used. With this configuration, it is possible to widen the band by providing the first radiating element 10 and the second radiating element 20.

The antenna device 101B illustrated in FIG. 1B is an example in which the capacitor C31 of the first phase adjusting element 31 is provided in the coupling element 30. That is, the coupling element 30 includes the capacitor C31 together with the first coil L1 and the second coil L2 that are electromagnetically coupled to each other.

Figure 2A:
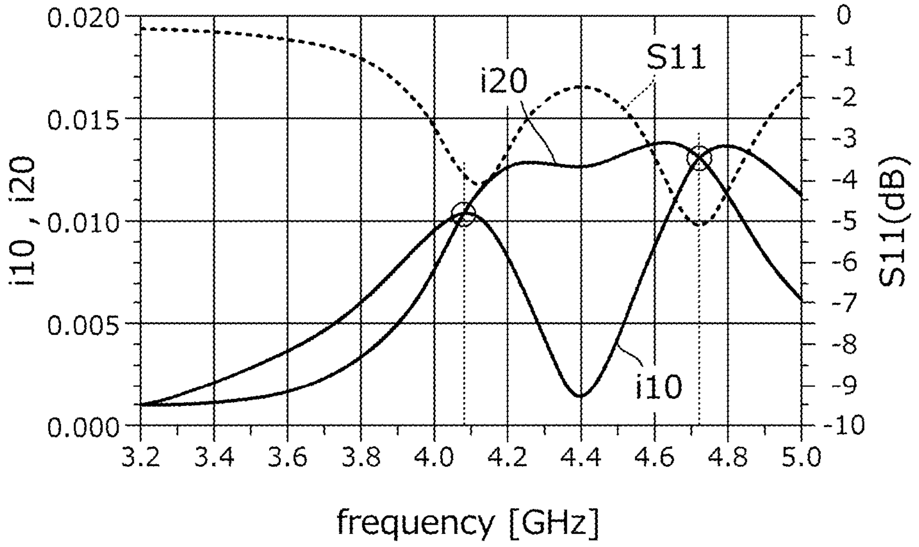
FIG. 2A is a graph showing characteristics of the antenna devices 101A and 101B in the first preferred embodiment of the present invention.
Figure 2B:
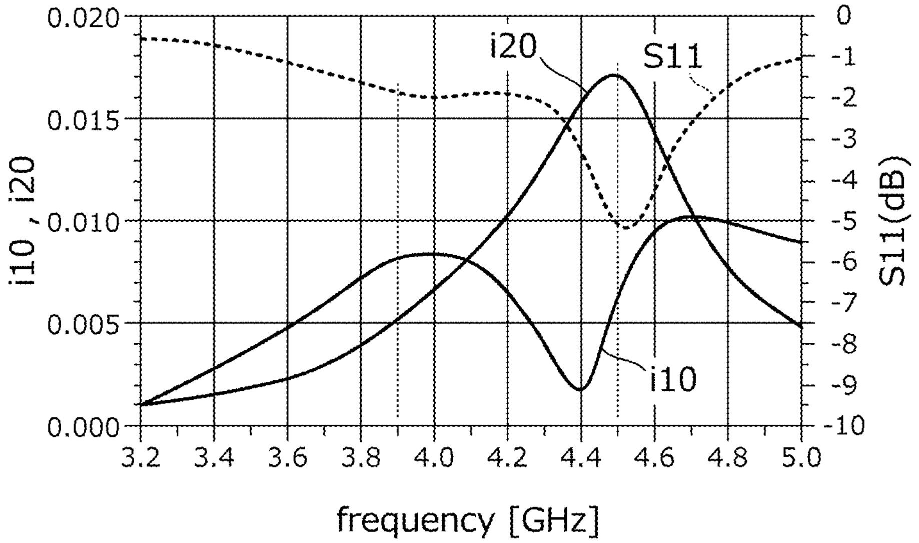
FIG. 2B is a graph illustrating characteristics of an antenna device as a comparative example.

FIG. 2A is a graph showing characteristics of the antenna devices 101A and 101B according to the first preferred embodiment, and FIG. 2B is a graph showing characteristics of an antenna device of a comparative example. The antenna device of the comparative example is obtained by removing the first phase adjusting element and the second phase adjusting element 32 from the antenna devices 101A and 101B illustrated in FIGS. 1A and 1B.

In FIGS. 2A and 2B, the current i10 flowing through the first radiating element 10, the current i20 flowing through the second radiating element 20, and a reflection coefficient S11 of the antenna device viewed from the power supply circuit 1 are indicated. In the antenna device of the comparative example, the resonant frequency of the second radiating element 20 is about 4.5 GHz and the resonant frequency of the first radiating element 10 is about 3.9 GHz. Further, in the antenna devices 101A and 101B according to the present preferred embodiment, the resonant frequency of the second radiating element 20 is about 4.7 GHz and the resonant frequency of the first radiating element 10 is about 4.1 GHz.

In the antenna device of the comparative example shown in FIG. 2B, the current i20 flowing through the second radiating element 20 has a peak in the vicinity of about 4.5 GHz. The reflection coefficient S11 at about 4.5 GHz is about −5 dB, which is low. However, the current i10 flowing through the first radiating element 10 is less than about ½ of the current i20 at about 4.5 GHz. That is, in an approximately 4.5 GHz band, the current flowing through the second radiating element 20 having low radiation efficiency is large but the current flowing through the first radiating element 10 having high radiation efficiency is small. Therefore, the antenna device of the comparative example has low radiation efficiency in the approximately 4.5 GHz band.

In the antenna devices 101A and 101B according to the present preferred embodiment, the capacitor C31 increases the current flowing through the first radiating element 10 at the resonant frequency of the second radiating element 20. Further, the inductor L32 causes the resonant current flowing through the second radiating element 20 to flow into the second coil L2 to adjust the phases of the currents flowing through the first radiating element 10 and the second radiating element 20. In the example shown in FIG. 2A, the current i20 flowing through the second radiating element 20 and the current i10 flowing through the first radiating element 10 are thus equal or substantially equal to each other in the vicinity of about 4.7 GHz as indicated by circle in the figure. The reflection coefficient S11 at about 4.7 GHz is about −5 dB, which is low. That is, in the approximate 4.7 GHz band, the current flowing through the second radiating element 20 is induced to the first radiating element 10 and is radiated not only from the second radiating element 20 but also from the first radiating element 10 with high efficiency. In this example, at the resonant frequency about 4.7 GHz of the second radiating element 20, the amount of the current induced to the first radiating element 10 and the amount of the current flowing through the second radiating element 20 are equal or substantially equal to each other.

Figure 3:
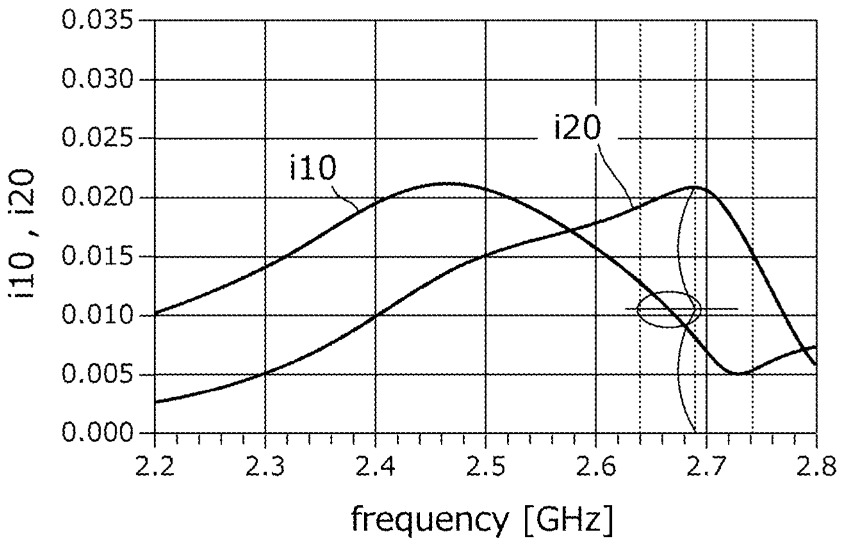
FIG. 3 is a graph showing characteristics of another antenna device according to the first preferred embodiment of the present invention.

FIG. 3 is a graph showing characteristics of another antenna device according to the first preferred embodiment. In FIG. 3, the current i10 flowing through the first radiating element 10 and the current i20 flowing through the second radiating element 20 are indicated. The resonant frequency of the second radiating element 20 in the antenna device is about 2.69 GHz, and the resonant frequency of the first radiating element 10 is about 2.46 GHz.

In FIG. 3, the center of three broken lines represents the resonant frequency of the second radiating element 20, which is about 2.69 GHz, and left and right broken lines represent a frequency band of about ±5% (about ±67.5 MHz). In this example, the current i10 flowing through the first radiating element 10 is equal to or more than about 50% of a current value of the current i20 flowing through the second radiating element 20 at the resonant frequency in the above-described approximate ±5% frequency band as indicated by ellipse in the figure. That is, in an approximate 2.7 GHz band, the current flowing through the second radiating element 20 is induced to the first radiating element 10 and is radiated not only from the second radiating element 20 but also from the first radiating element 10 with high efficiency.

As described above, when the current induced to the first radiating element 10 is equal to or more than about 50% of the amount of the current flowing through the second radiating element 20 at the resonant frequency of the second radiating element 20, the current flowing through the second radiating element 20 is induced to the first radiating element 10 and is radiated from the first radiating element 10 with high efficiency. The radiation efficiency in the vicinity of the resonant frequency of the second radiating element 20 is therefore increased to widen the band.

In the antenna devices 101A and 101B according to the present preferred embodiment, as shown in FIGS. 2A and 2B, the current i10 in the vicinity of the resonant frequency of about 4.1 GHz, which flows through the first radiating element 10 having preferable radiation efficiency, is equivalent between FIGS. 2A and 2B. The current i20 flowing through the second radiating element 20 and the current i10 flowing through the first radiating element 10 are also equal or substantially equal to each other in the vicinity of about 4.1 GHz. Further, the reflection coefficient S11 at about 4.1 GHz is about −4 dB, which is low. That is, in the approximate 4.1 GHz band, the current flowing through the second radiating element 20 is induced to the first radiating element 10 and is radiated not only from the second radiating element 20 but also from the first radiating element 10 with high efficiency.

Figure 4:
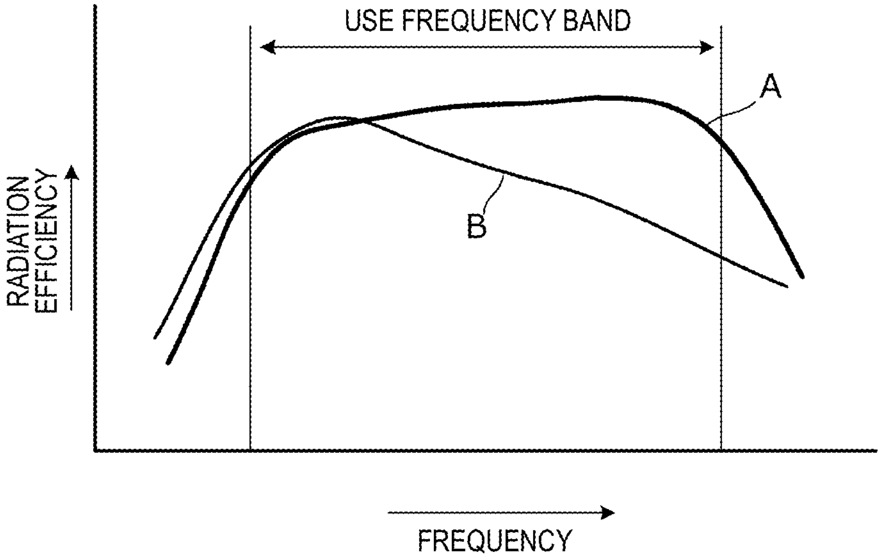
FIG. 4 is a graph showing frequency characteristics of radiation efficiency of the antenna devices 101A and 101B in the first preferred embodiment of the present invention and the antenna device as the comparative example.

FIG. 4 is a graph showing frequency characteristics of the radiation efficiency in the antenna devices 101A and 101B according to the present preferred embodiment and the antenna device of the comparative example. A in FIG. 4 indicates the characteristics of the antenna devices 101A and 101B according to the present preferred embodiment, and B indicates the characteristics of the antenna device of the comparative example. In the antenna devices 101A and 101B according to the present preferred embodiment, the current at the resonant frequency (the high-frequency side of a use frequency band) of the second radiating element 20 largely flows through the first radiating element 10 having high radiation efficiency. Therefore, the antenna device having high radiation efficiency over the entire area of the usable frequency band (for example, a wide band of about 3.9 GHz to about 4.8 GHz) is provided.

Figure 5:
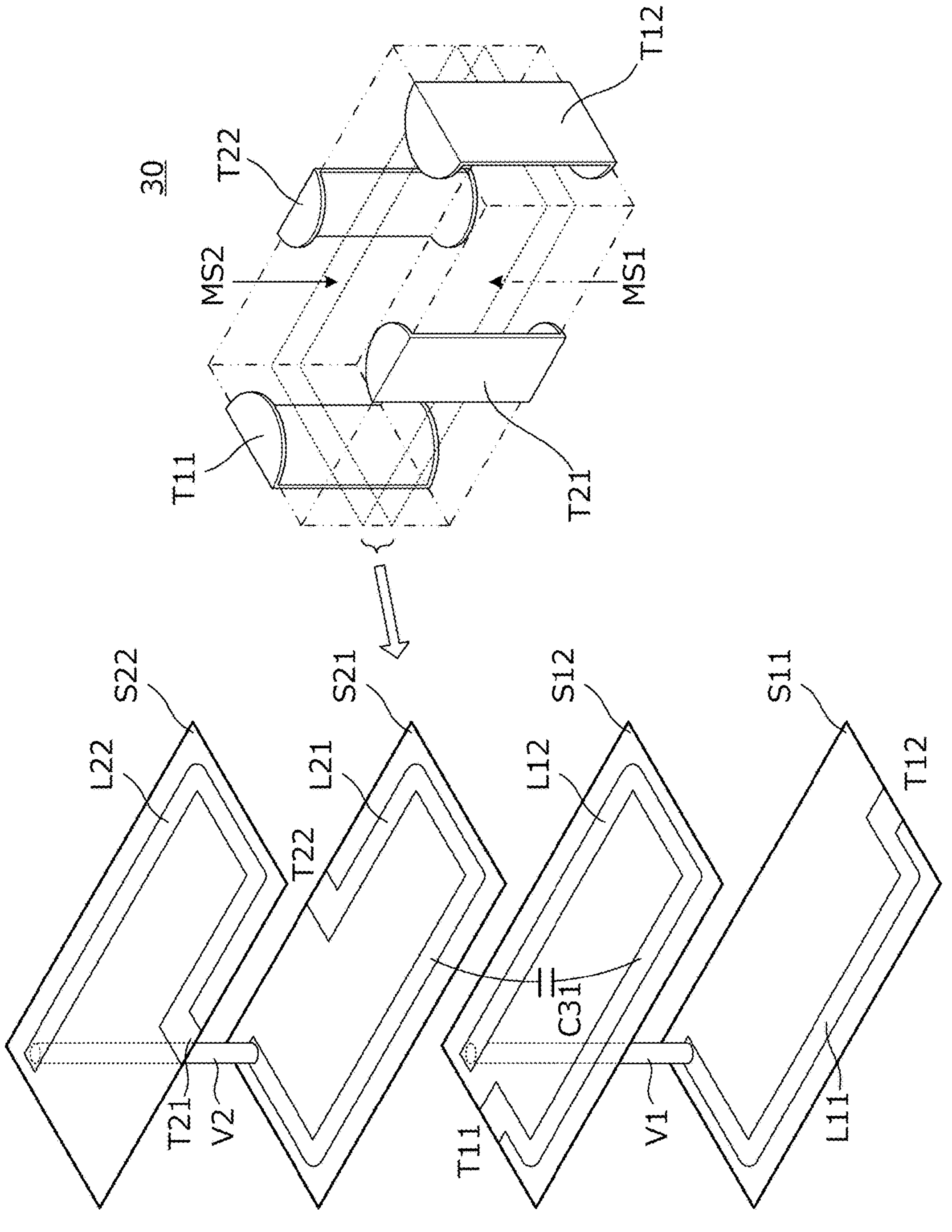
FIG. 5 is a perspective view of a coupling element 30.

Next, the configuration of the coupling element 30 included in the antenna device 101B illustrated in FIG. 1B will be described. FIG. 5 is a perspective view of the coupling element 30, and FIG. 6 is an exploded plan view illustrating conductor patterns provided in respective layers of the coupling element 30.

The coupling element 30 included in the antenna device 101B according to the present preferred embodiment is a rectangular or substantially rectangular parallelepiped chip component mounted on a circuit substrate. FIG. 5 illustrates it such that the outer shape of the coupling element 30 and the internal structure thereof are separated from each other. The outer shape of the coupling element 30 is indicated by two-dot chain lines. The first end T11 of the first coil, the second end T12 of the first coil, the first end T21 of the second coil L2, and the second end T22 of the second coil L2 are provided on the outer surface of the coupling element 30. Further, the coupling element 30 includes a first surface MS1 and a second surface MS2 opposite to the first surface MS1.

A first conductor pattern L11, a second conductor pattern L12, a third conductor pattern L21, and a fourth conductor pattern L22 are provided in the coupling element 30. The first conductor pattern L11 and the second conductor pattern L12 are connected to each other with an interlayer connection conductor V1 interposed therebetween. The third conductor pattern L21 and the fourth conductor pattern L22 are connected to each other with an interlayer connection conductor V2 interposed therebetween. FIG. 5 illustrates insulating substrates S11, S12, S21, and S22 on which the conductor patterns are respectively provided in an exploded manner in the lamination direction.

Figure 6:
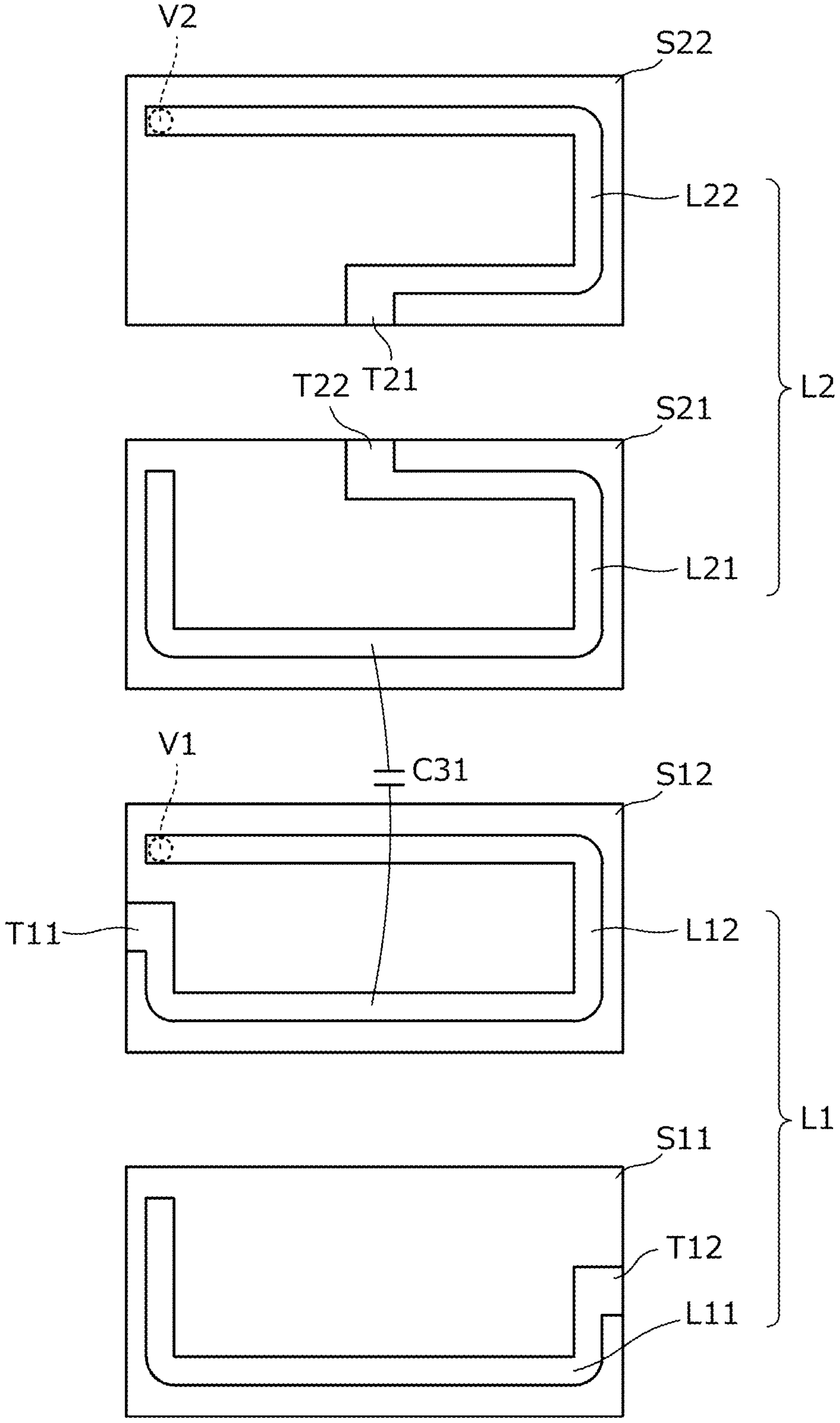
FIG. 6 is an exploded plan view illustrating conductor patterns provided in respective layers of the coupling element 30.

As indicated in FIG. 6, the first conductor pattern L11, the second conductor pattern L12, the third conductor pattern L21, and the fourth conductor pattern L22 are provided in this order from the layer close to a mounting surface. A first end of the first conductor pattern L11 is connected to the second end T12 of the first coil, and a second end thereof is connected to a first end of the second conductor pattern L12 with the interlayer connection conductor V1 interposed therebetween. A second end of the second conductor pattern L12 is connected to the first end T11 of the first coil. Further, a first end of the third conductor pattern L21 is connected to the second end T22 of the second coil, and a second end of the third conductor pattern L21 is connected to a first end of the fourth conductor pattern L22 with the interlayer connection conductor V2 interposed therebetween. A second end of the fourth conductor pattern L22 is connected to the first end T21 of the second coil.

Further, the winding direction from the first end T11 to the second end T12 of the first coil L1 and the winding direction from the first end T21 to the second end T22 of the second coil L2 are the same. That is, the direction of the magnetic field generated in the first coil L1 when the current flows from the first coil L1 to the first radiating element 10 and the direction of the magnetic field generated in the second coil L2 when the current flows from the second coil L2 to the second radiating element 20 are opposite to each other.

As illustrated in FIGS. 5 and 6, the second conductor pattern L12 and the third conductor pattern L21 run in parallel or substantially in parallel so as to be adjacent to each other in the lamination direction, and parasitic capacitance is generated between the second conductor pattern L12 and the third conductor pattern L21. This parasitic capacitance is the capacitor C31 of the first phase adjusting element 31.

It is possible to reduce the number of mounted components on the circuit substrate by configuring the capacitor C31 of the first phase adjusting element 31 by the parasitic capacitance generated between the first coil L1 and the second coil L2 as described above. When the above-described parasitic capacitance is generated, there is an advantageous effect that the coupling coefficient of the electromagnetic field between the first coil L1 and the second coil L2 increases.

When the capacitance of the capacitor C31 is insufficient in the antenna device 101B illustrated in FIG. 1B, the capacitor C31 may be added to the outside of the coupling element 30, as illustrated in FIG. 1A.

Second Preferred Embodiment

In a second preferred embodiment of the present invention, an example of an electronic apparatus including the antenna device according to the first preferred embodiment will be described.

Figure 7:
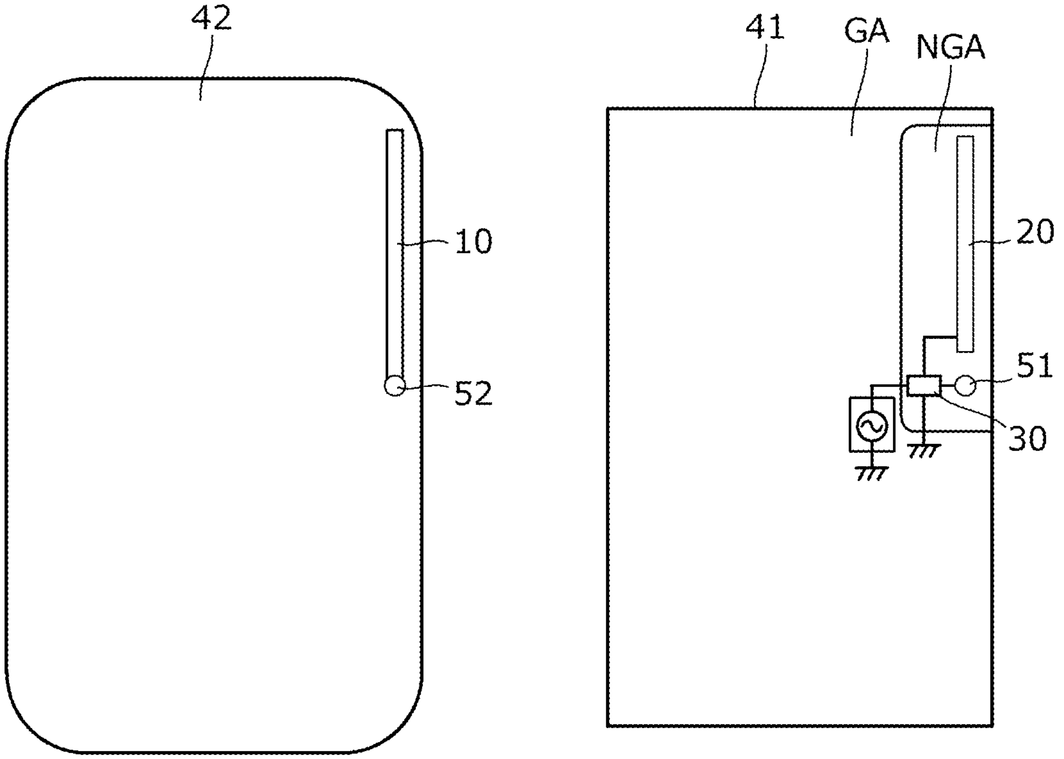
FIG. 7 is a view illustrating the internal configuration of an electronic apparatus according to a second preferred embodiment of the present invention.

FIG. 7 is a view illustrating the internal configuration of the electronic apparatus according to the second preferred embodiment. The electronic apparatus is, for example, a communication terminal such as a cellular phone. The electronic apparatus includes an inner housing 42 and a circuit substrate 41 inside an outer housing thereof.

A ground conductor non-formation region NGA is provided on the circuit substrate 41, and the second radiating element 20 is provided in the ground conductor non-formation region NGA. The second radiating element 20 is, for example, a conductor pattern provided on the circuit substrate 41.

The inner housing 42 is a resin-molded body, and the first radiating element 10 is provided in the inner housing 42. The first radiating element 10 is, for example, a conductor pattern provided on a flexible substrate, and the first radiating element 10 is provided by attaching the flexible substrate to the inner housing 42. Alternatively, the first radiating element 10 is configured by providing a conductor pattern on the surface of the inner housing 42 by, for example, a laser direct-structuring (LDS) method.

The first radiating element 10 is provided along an insulator and is separated from the ground conductor formation region GA of the circuit substrate 41 as compared with the second radiating element 20. That is, since a wide electromagnetic field space extends around the first radiating element 10, the radiation efficiency of the first radiating element 10 is high. On the other hand, since the second radiating element 20 is provided in the ground conductor non-formation region NGA in a limited area of the circuit substrate 41, an electromagnetic field space around the second radiating element 20 is narrow. Therefore, the radiation efficiency thereof is lower than that of the first radiating element 10.

Types of the radiation efficiency of the radiating element are exemplified as follows.

(1) As the gap between the radiating element and the ground conductor in the planar direction and the thickness direction (lamination direction) is larger, the radiation efficiency is higher.

(2) As capacitance generated between the radiating element and the ground conductor is smaller, the radiation efficiency is higher.

(3) When the ground conductor is present in the vicinity of end portions and side portions of the housing of the electronic apparatus, the radiation efficiency is higher as an arrangement position of the radiating element is farther from the end portions and the side portions of the housing.

As indicated in FIG. 7, a case-substrate connecting portion 51 is provided on the circuit substrate 41, and a case-substrate connecting portion 52 is provided on the inner housing 42. The first radiating element 10 and the second radiating element 20 are connected to each other with the case-substrate connecting portions 51 and 52 interposed therebetween.

Figure 8:
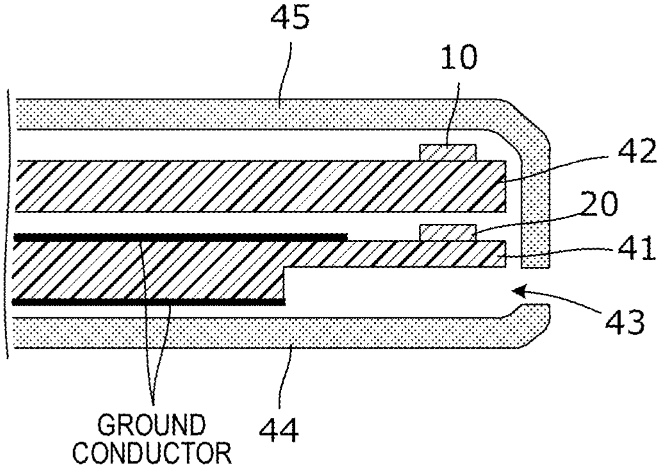
FIG. 8 is a partial sectional view illustrating the configuration of another electronic apparatus according to the second preferred embodiment of the present invention.

FIG. 8 is a partial sectional view illustrating the configuration of another electronic apparatus according to the second preferred embodiment. The electronic apparatus includes the circuit substrate 41, the inner housing 42, and the like between a lower housing 44 and an upper housing 45. Further, a card slot 43 is provided between the circuit substrate 41 and the lower housing 44. A card device such as a SIM card, for example, is mounted on the card slot 43.

The first radiating element 10 is provided on the inner housing 42, and the second radiating element 20 is provided on the circuit substrate 41. The configurations of the first radiating element 10 and the second radiating element 20 are as illustrated in FIG. 7.

The second radiating element 20 is provided at a position overlapping with a mounting portion of the card device in a plan view of the card device. Since no ground conductor is provided around the card slot 43 of the circuit substrate 41, it is possible to increase a gap between the ground conductor and the second radiating element 20, thus increasing the radiation efficiency of the second radiating element 20.

Although FIG. 7 and FIG. 8 illustrate the examples in which the second radiating element 20 is provided on the circuit substrate 41, both of the first radiating element 10 and the second radiating element 20 may be provided in a housing of the electronic apparatus. This configuration can increase the radiation efficiency of the first radiating element 10 alone and the second radiating element 20 alone.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:

a first radiating element;

a second radiating element;

a first coil including a first end connected to a power supply circuit and a second end connected to the first radiating element;

a second coil including a first end connected to the second radiating element and a second end connected to ground and is electromagnetically coupled to the first coil;

a first phase adjusting element including a first end connected to the power supply circuit and a second end connected to the ground to adjust a phase difference between a first current flowing through the first radiating element and a second current flowing through the second radiating element; and a second phase adjusting element including a first end connected to the first end of the second coil and a second end connected to the ground to adjust the phase difference between the first current flowing through the first radiating element and the second current flowing through the second radiating element.

2. The antenna device according to claim 1, wherein the first phase adjusting element and the second phase adjusting element induce a predetermined proportion of the second current flowing through the second radiating element to the first radiating element at a resonant frequency of the second radiating element; and the first current that is induced to the first radiating element at the resonant frequency of the second radiating element is equal to or more than about 50% of an amount of the second current flowing through the second radiating element.

3. The antenna device according to claim 1, wherein the first phase adjusting element includes a capacitor; and the second phase adjusting element includes an inductor.

4. The antenna device according to claim 3, wherein the capacitor increases the first current flowing through the first radiating element at the resonant frequency of the second radiating element; and the inductor causes resonant current flowing through the second radiating element to flow into the second coil.

5. The antenna device according to claim 1, wherein the first coil and the second coil are electromagnetically coupled to each other to define a coupling element; and the first phase adjusting element is defined by a parasitic capacitance generated between the first end of the first coil and the second end of the second coil.

6. The antenna device according to claim 1, wherein the first radiating element is provided in a housing of an electronic apparatus, and the second radiating element is provided on a circuit substrate in the housing.

7. The antenna device according to claim 6, wherein the circuit substrate includes a ground conductor pattern; and a formation position of the second radiating element on the circuit substrate is in a non-formation region of the ground conductor pattern.

8. The antenna device according to claim 1, wherein the first radiating element and the second radiating element are provided in a housing of an electronic apparatus.

9. The antenna device according to claim 1, wherein connection of the first radiating element to the first coil and connection of the second radiating element to the second coil are structured such that a direction of a magnetic field generated in the first coil when the first current flows from the first coil to the first radiating element and a direction of a magnetic field generated in the second coil when the second current flows from the second coil to the second radiating element are opposite to each other.

10. The antenna device according to claim 1, wherein connection of the first radiating element to the first coil and connection of the second radiating element to the second coil are structure such that a direction of a magnetic field generated in the first coil when the first current flows from the first coil to the first radiating element and a direction of a magnetic field generated in the second coil when the second current flows from the second coil to the second radiating element are the same.

11. An electronic apparatus comprising:

the antenna device according to claim 1;

the power supply circuit; and a housing that houses the power supply circuit.

12. The electronic apparatus according to claim 11, wherein the housing includes a mounting portion of a card device; and a formation position of the second radiating element overlaps with the mounting portion of the card device in a plan view of the card device.

13. The electronic apparatus according to claim 12, wherein the first phase adjusting element and the second phase adjusting element induce a predetermined proportion of the second current flowing through the second radiating element to the first radiating element at a resonant frequency of the second radiating element; and the first current that is induced to the first radiating element at the resonant frequency of the second radiating element is equal to or more than about 50% of an amount of the second current flowing through the second radiating element.

14. The electronic apparatus according to claim 12, wherein the first phase adjusting element includes a capacitor; and the second phase adjusting element includes an inductor.

15. The electronic apparatus according to claim 14, wherein the capacitor increases the first current flowing through the first radiating element at the resonant frequency of the second radiating element; and the inductor causes resonant current flowing through the second radiating element to flow into the second coil.

16. The electronic apparatus according to claim 12, wherein the first coil and the second coil are electromagnetically coupled to each other to define a coupling element; and the first phase adjusting element is defined by a parasitic capacitance generated between the first end of the first coil and the second end of the second coil.

17. The antenna device according to claim 1, wherein the first radiating element is provided in the housing, and the second radiating element is provided on a circuit substrate in the housing.

18. The antenna device according to claim 17, wherein the circuit substrate includes a ground conductor pattern; and a formation position of the second radiating element on the circuit substrate is in a non-formation region of the ground conductor pattern.

19. The electronic apparatus according to claim 12, wherein the first radiating element and the second radiating element are provided in the housing.

20. The electronic apparatus according to claim 12, wherein connection of the first radiating element to the first coil and connection of the second radiating element to the second coil are structured such that a direction of a magnetic field generated in the first coil when the first current flows from the first coil to the first radiating element and a direction of a magnetic field generated in the second coil when the second current flows from the second coil to the second radiating element are opposite to each other.

* * * * *